(12) United States Patent
Nivet

(10) Patent No.: US 9,796,299 B2
(45) Date of Patent: Oct. 24, 2017

(54) VEHICLE SEAT

(71) Applicant: ZODIAC ACTUATION SYSTEMS, Auxerre (FR)

(72) Inventor: Laurent Nivet, Gif sur Yvette (FR)

(73) Assignee: ZODIAC ACTUATION SYSTEMS, Auxerre (FR)

( * ) Notice: Subject to any disclaimer, the term of this patent is extended or adjusted under 35 U.S.C. 154(b) by 167 days.

(21) Appl. No.: 14/711,412

(22) Filed: May 13, 2015

(65) Prior Publication Data

US 2015/0329012 A1 Nov. 19, 2015

(30) Foreign Application Priority Data

May 15, 2014 (FR) ..................................... 14 54351

(51) Int. Cl.
| | |
|---|---|
| *B60N 2/02* | (2006.01) |
| *B60N 2/44* | (2006.01) |
| *B60N 2/48* | (2006.01) |
| *B60N 2/22* | (2006.01) |
| *B60N 2/10* | (2006.01) |

(52) U.S. Cl.
CPC ......... *B60N 2/0224* (2013.01); *B60N 2/0244* (2013.01); *B60N 2/10* (2013.01); *B60N 2/22* (2013.01); *B60N 2/4495* (2013.01); *B60N 2/4838* (2013.01); *B60N 2002/0272* (2013.01)

(58) Field of Classification Search
CPC ................ B60N 2/0224; B60N 2/0244; B60N 2002/0272; B60N 2/10; B60N 2/22; B60N 2/4838; B60N 2/4495

USPC ........................................................ 297/217.2
See application file for complete search history.

(56) References Cited

U.S. PATENT DOCUMENTS

| | | | | |
|---|---|---|---|---|
| 5,123,495 | A * | 6/1992 | Littlejohn | A61G 5/061 180/9.32 |
| 8,457,846 | B2 * | 6/2013 | Fischer | B60N 2/0224 701/36 |
| 2003/0057910 | A1 * | 3/2003 | Nivet | B60N 2/0232 318/652 |
| 2007/0182570 | A1 * | 8/2007 | Overturf | A61G 5/10 340/573.1 |
| 2013/0062921 | A1 | 3/2013 | Meyer et al. | |
| 2014/0001802 | A1 * | 1/2014 | Piaulet | B60N 2/002 297/217.2 |
| 2014/0217792 | A1 | 8/2014 | Meyer | |

FOREIGN PATENT DOCUMENTS

WO WO 2010/056193 A1 5/2010

\* cited by examiner

*Primary Examiner* — Milton Nelson, Jr.
(74) *Attorney, Agent, or Firm* — Davidson, Davidson & Kappel, LLC

(57) ABSTRACT

A vehicle seat is provided including at least first and second movable seat elements relatively to each other and at least one actuator ensuring a relative movement between both elements. The actuator includes a sensor for measuring a piece of representative information of the position of a first seat element relatively to a second seat element. The sensor includes an inclinometer secured to the first seat element. The piece of representative information of the position of the first seat element is an inclination of the first seat element.

3 Claims, 2 Drawing Sheets

VEHICLE SEAT

This claims the benefit of French Patent Application FR 14 54351, filed May 15, 2014 and hereby incorporated by reference herein.

The present invention relates to a seat, notably of a vehicle including at least one first and second elements movable relatively to each other and at least one actuator ensuring a relative movement between both elements, including a sensor for measuring a piece of information representative of the position of the first seat element relatively to a second seat element.

BACKGROUND

Airplane seats are currently fitted with many elements movable relatively to each other under the action of electrically controlled actuators. In order to ensure the comfort of the passengers, and to make sure that the seat will not hit elements of the cabin, such as the floor, the seat comprises a computer able to continuously determine the position of certain particular points of the seat and notably the end points of the latter.

In order to ensure this computation, each actuator is fitted with a sensor allowing its position to be known. This sensor is for example formed with a potentiometer or a coding wheel. It is positioned between two movable portions of the actuator.

From the position of each actuator and from knowledge of the geometry of the seat, the computer determines the position of each element of the seat, and of particular points of the latter.

SUMMARY OF THE INVENTION

The above solution requires having a sensor in each actuator, which complicates the structure of the actuator. These sensors are generally sources of wear for the actuator.

Further, it is necessary to calibrate the position sensors of the actuators mounting the actuator on the seat, and notably in the case of rotary actuators, in order to associate a particular position of the sensor of the actuator with a reference position of the seat element controlled by the actuator.

The calibration method is relatively complex and increases the manufacturing time and the time for putting the seat into use.

Further, computing in space the position of an end of a element of the seat is related to the position of one or several actuators and to their connections in the seat. Each mechanical modification of the connections of an actuator forces to completely reconsider how the position of this end of the relevant elements is computed. This imposes long development times during adaptations to different seat mechanisms.

Also, certain seats have mechanical elasticity of its different elements. This does not allow determination of the actual position of its ends from the position of each actuator. A position of an actuator corresponds to an angle on the loadless relevant seat element. A load applied on the seat may change the angle of this element by elasticity of this elements without a change in position of the relevant actuator. The provided measurements are therefore inaccurate.

An object of the invention is to provide a vehicle seat with which it is possible to avoid the drawbacks resulting from the presence of a position sensor in the actuator positioned between two movable portions of the actuator.

For this purpose, a seat is provided wherein the sensor comprises an inclinometer secured to the first seat element and in that the piece of information representative of the position of the first seat element is an inclination of the first seat element.

According to a particular embodiment of the invention the seat itself includes several of the following features:
- the sensor is connected to the information processor for providing a piece of inclination information relatively to a common reference;
- it includes a reference inclination sensor including a corrector for correcting the value of each inclination sensor from the reference inclination;
- the first and second seat elements are successive in the seat, the first seat element being borne and directly movable relatively to the second seat element, the first and second seat element each include an inclination sensor, each inclination sensor being connected to the information processor in order to provide the latter with a relative inclination of the first element relatively to the second element; and
- at least one seat element, displaceable relatively to another seat element in translation, includes an accelerometer able to measure the relative acceleration between both seat elements as well as a computer for computing the relative position of both seat elements by double integration over time of the measured acceleration.

BRIEF SUMMARY OF THE DRAWINGS

The invention will be better understood upon reading the description which follows, only given as example and made with reference to the drawings, wherein.

DETAILED DESCRIPTION

Figure 1:
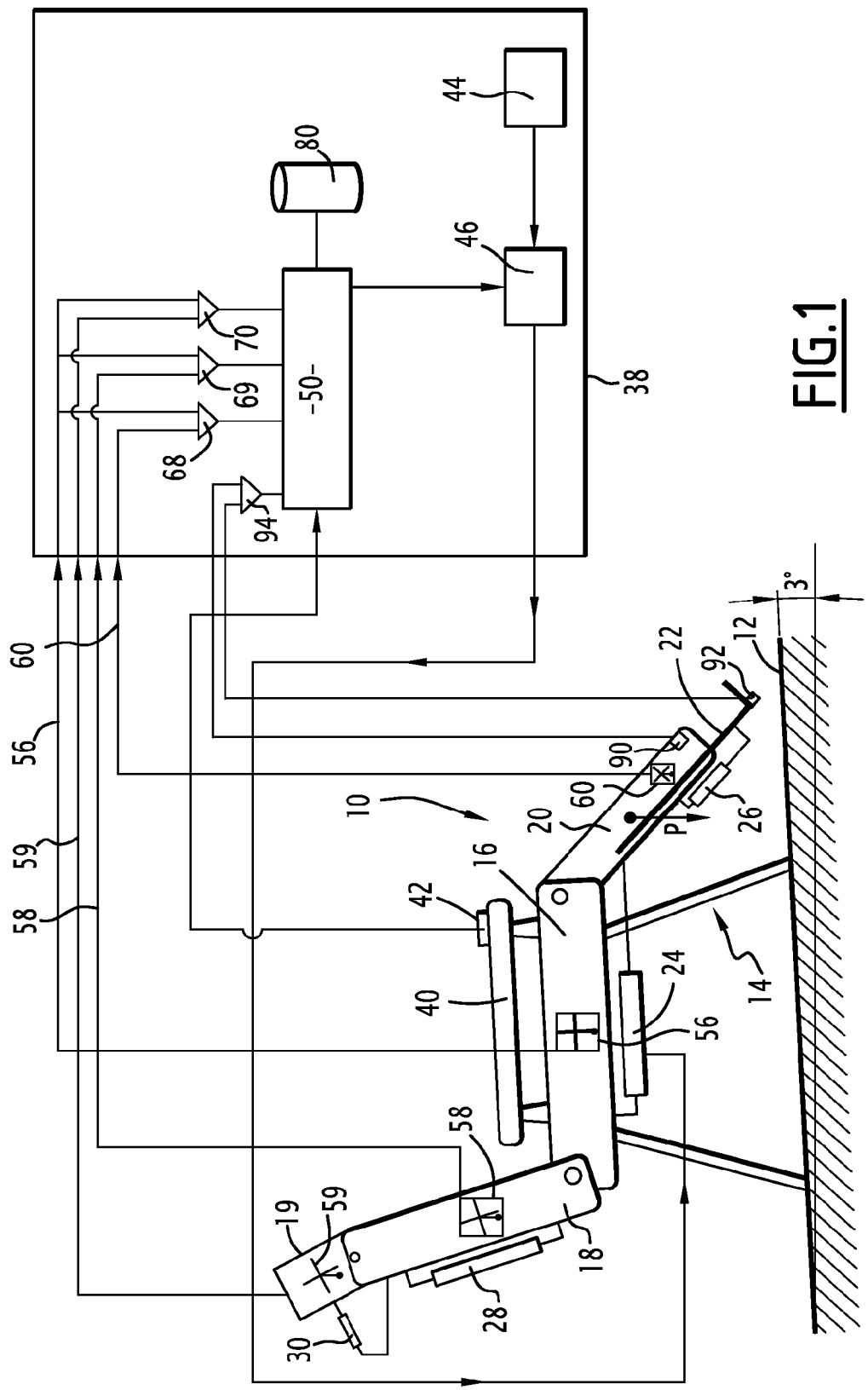
FIG. 1 is a schematic view of a vehicle seat according to an embodiment of the invention mounted in an airplane during a normal flight phase.

The seat 10 illustrated in FIG. 1 is a passenger seat of an airplane. This seat is attached on the floor 12 of the airplane. The airplane is assumed to be in a normal flight phase, so that the floor 12 of the airplane forms an angle of +3° with the horizontal.

The seat includes a base 14 secured to the floor 12 on which rests a seat area 16 substantially parallel to the floor of the airplane. At one end of the seat area, a backrest 18 is jointed at the top of which is jointed a headrest 19.

At the other end of the seat area 16, is jointed a leg rest 20 which is displaceable between a folded-back position substantially perpendicular to the floor above the seating area 16 and an extended position substantially parallel to the floor in the extension of the seating area 16.

The seat 10 further includes a footrest 22 mounted so as to be slidably displaceable relatively to the legrest 20 in the extension of the latter.

The footrest 22 is translationally displaceable between a retracted position inside the legrest 20 and an extended position in which it extends the latter and is practically totally extracted out of the latter.

An electric actuator 24 is borne between the seating area 16 and the legrest 20 so as to ensure the displacement of the latter between its folded-back position and its extended position.

Also, an electric actuator 26 is interposed between the legrest 20 and the footrest 22. Two other actuators 28, 30 are respectively interposed between the seating area 16 and the backrest 18, on the one hand, and between the backrest 18 and the headrest 19, on the other hand.

Each actuator 24, 26, 28, 30 is supplied with electric current from a manager 38 for managing the operation of the seat.

Further, the seat includes an armrest 40 on which is attached a control keyboard 42 allowing control of the actuators 24, 26, 28, 30 in order to cause a displacement of the element which it controls.

The control keyboard 42 is connected to the manager 38 for managing operation of the seat.

The manager 38 includes a source 44 for supplying power to the actuator. The latter is for example formed with a transformer connected to the general electric power supply network of the airplane through a suitable connector.

Further, a power supply interface 46 ensuring the supply of power to each actuator 24, 26, 28, 30 is provided at the outlet of the power supply source 44. This interface ensures the shaping of the power supply current of the actuator depending on the desired actuation direction and displacement speed.

The power supply interface 46 is driven by a central information processor 50. This processor 50 is connected to the control keyboard 42, in order to collect the command orders of the user.

For operating the seat, the central information processor 50 applies a suitable program known per se for controlling the power supply interface 46 so that the latter ensures the power supply of the actuators 24, 26, 28, 30 in one direction or in the other by inverting the current direction, depending on the information received from the keyboard 42.

According to embodiments of the invention, certain movable elements of the seat each include a specific inclinometer, respectively noted as 56, 58, 59, 60 for the seating area 16, the backrest 18, the headrest 19 and the legrest 20. These inclinometers are each able to determine the absolute inclination of the seat element 16, 18, 19, 20 including it relatively to the vertical, i.e. relatively to the direction of the Earth's attraction. These inclinometers are rigidly bound to the seat element including them. They are for example formed by inclinometers with an accelerometer.

According to a first embodiment, each inclinometer is a single-axis inclinometer, measuring the inclination around an axis perpendicular to the advance direction of the airplane and extending parallel to the floor of the airplane.

According to another embodiment, the inclinometer is a multi-axis inclinometer, allowing measurement of the inclination of the airplane around several axes, notably perpendicular two by two.

The use of such a multi-axis sensor gives the possibility of determining the inclination of the seat element, regardless of the mounting axis of the seat relatively to the advance direction of the airplane and during inclined flight phases of the airplane because of a turn.

Each inclinometer is connected to the manager 38 for managing operation of the seat.

In the relevant example, the seating area 16 is secured to the floor of the aircraft and is used as a reference for positioning other movable seat elements.

According to a first embodiment illustrated in FIG. 1, the inclinometers 58, 59, 60 are each connected in the manager 38 to a first terminal of a subtractor 68, 69, 70 respectively the second terminal of which is connected to the output of the inclinometer 56. Thus, each inclinometer 58, 59, 60, associated with the corresponding subtractor, is a measurer for measuring an inclination relative to a common reference of the seat element on which it is attached to relatively to the seating area 16. The seating area 16 then forms the common reference. The outputs of the subtractors 68, 69, 70 are connected to the central information processor 50.

This same information processor 50 is connected to a database 80 including the whole of the dimensional characteristics of the seat, and notably the length of the seat elements and the distance separating the axes of rotation of the different elements.

The processor 50 is able to continuously apply a program allowing determination, from the relative inclination to the measured common reference of each seat element and from the dimensional characteristics of the seat contained in the database 80, the positions relatively to the seating area 16 of each of the jointed seat elements 18, 19 and 20.

The processor 50 is able to in particular determine the position of the end point of each seat element.

For example, in the case of the upper end of the headrest 19, the position $(x_s, y_s)$ of the end of point of the headrest is given by the following formulae in a reference system centered on the axis of rotation of the backrest on the seating area and for which the axis x-x is parallel to the floor of the airplane and to the seating area and the axis y-y is perpendicular to the floor and to the seating area.

$$x_s = L_{18} \cos(180° - (\theta_{58} - \theta_{56})) + L_{19} \cos(180° - (\theta_{59} - \theta_{56}))$$

$$y_s = L_{18} \sin(180° - (\theta_{58} - \theta_{56})) + L_{19} \sin(180° - (\theta_{59} - \theta_{56}))$$

wherein $L_{18}$ = distance between the axes of rotation of the backrest on the seating area and of the headrest on the backrest;

$L_{19}$ = length of the headrest measured from the axis of rotation of the headrest on the backrest;

$\theta_{58}$ = inclination value provided by the inclinometer 58 of the backrest; and $\theta_{59}$ = inclination value provided by the inclinometer 59 of the headrest.

Moreover, the legrest 20 and the footrest 22 are each provided with an accelerometer 90, 92 respectively, both of these accelerometers being connected to the information processor 50 of the manager 38 for managing operation of the seat through a subtractor 94.

The information processor 50 is able to continuously receive the relative acceleration between the footrest 22 and the legrest 20, obtained from the difference between both absolute accelerations measured by the sensors 90, 92. It is also able to compute, by double integration of the acceleration relatively to time, the position of the footrest 22 relatively to the legrest 20, this computation being accomplished by considering the initial position of the legrest as the last known position of the latter before its displacement and by considering the speed of the footrest relatively to the legrest as 0 at the beginning of the displacement of the footrest relatively to the legrest.

It is conceivable that with such an arrangement, the manager 38 for managing the seat permanently determines the relative position with respect to a common reference of each of the seat elements, without it being necessary to resort to position sensors integrated to the actuators, thereby avoiding problems of actuator wear as well as the requirement of an initial calibration, the inclinometers and/or acceleration sensors being rigidly attached accurately on the elements of seats, thereby making any initial calibration unnecessary.

Figure 2:
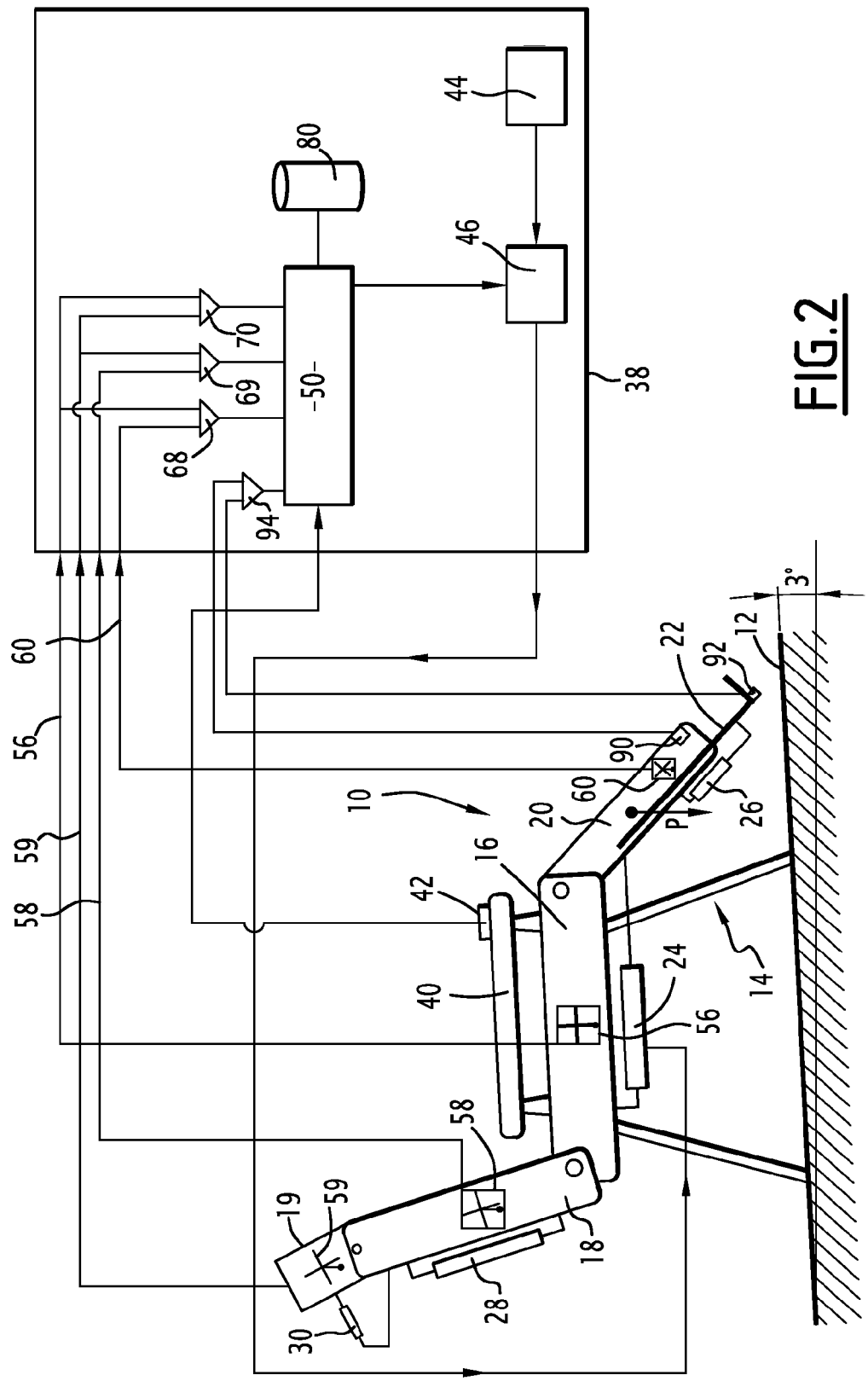
FIG. 2 is an identical view with that of FIG. 1, of another embodiment of the invention.

In the alternative embodiment of FIG. 2, the seat is equipped with a measurer for measuring the relative inclination of the successive elements of the seat relatively to each other.

By successive elements are meant elements which are mounted so as to be movable and notably directly jointed with each other. Thus, the headrest 19 and the backrest 18 are two successive elements, the measurer for measuring the relative inclination with each other ensure a determination of the inclination of the headrest 19 with respect to the backrest 18, itself movable and not relatively to a common element, notably the seating area 16 like in the embodiment of FIG. 1.

Only the differences with the embodiment of FIG. 1 will be described in the following.

In particular, and as illustrated in FIG. 2, the inclinometers 58 and 59 are connected to the two inputs of a subtractor 69, the output of which is connected to the information processor 50. The inclinometers 56, 59 and 60 are connected like in the embodiment of FIG. 1 to the subtractors 68 and 70.

In this embodiment, the pieces of information of the processor 50 are relative inclinations corresponding to the angular shift existing between two successive elements jointed on one another.

The processor 50 applies a program giving the possibility from information contained in the base 80 and from the measured relative inclinations, of determining the position of each of the seat elements and in particular the position of the end points. In this embodiment, the position of the upper endpoint of the headrest 19 is given by $$x_s = L_{18} \cos(180° - \theta_{58-56}) + L_{19} \cos(180° - \theta_{59-56})$$

$$y_s = L_{18} \sin(180° - \theta_{58-56}) + L_{19} \sin(180° -_{59-56})$$

wherein $L_{18}$=distance between the axis of rotation of the backrest on the seating area and of the headrest on the backrest;

$L_{19}$=length of the headrest measured from the axis of rotation of the headrest on the backrest;

$\theta_{58-56}$=relative inclination value between the backrest and the seating area; and $\theta_{59-56}$=relative inclination value between the headrest and the seating area.

Alternatively, the seating area 16 is without any inclinometer and the manager 38 for managing the seat includes the inclinometer 56 able to determine the inclination of the airplane, and therefore the inclination of the seating area of the seat relatively to the horizontal, this in the median longitudinal plane of the airplane.

This inclinometer is integrated into the structure of the seat 10 or into the manager 38 for managing the seat, itself integrated into the structure of the seat.

The inclinometer is connected to the manager 38 through an input for receiving a piece of information representative of the inclination.

According to a particular embodiment, each seat or each pair of seats is a fitted out with a reference inclinometer 56 ensuring a measurement of the absolute inclination of the actual seating area 16 itself.

According to another embodiment, several seats are equipped with inclinometers 56 and the managers for which the seats are without any inclinometer, are equipped with an input for receiving a piece of inclination information collected to an inclinometer present on another central manager equipped with an inclinometer.

According to further another embodiment, several seats are equipped with inclinometers 56 and all the inclinometers are connected to an estimator for estimating the inclination, which, from the different inclinations measured by the inclinometers, determines an overall inclination, for example with a majority vote algorithm or with an averaging algorithm. This overall inclination information is addressed to each central processor for processing information from the managers 38.

According to further another alternative, the seats are without any inclinometers and the managers 38 for managing the seats have an input for receiving a piece of inclination information, connected to the flight management system of the aircraft, which includes a determiner for determining the inclination of the aircraft and is able to pass on this information to the managers 38.

What is claimed is:

1. A vehicle seat comprising:
at least one first and one second seat elements movable relatively to each other;
at least one actuator ensuring a relative movement between both the first and second movable elements, the actuator including a sensor for measuring a piece of representative information of a position of the first seat element relatively to the second seat element, the sensor including an inclinometer secured to the first seat element, the information representative of the position of the first seat element is an inclination of the first seat element, the sensor being connected to an information processor for providing a piece of relative inclination information relatively to a common reference;
a reference inclinometer; and
a corrector for correcting the value of each inclinometer from the reference inclination.

2. The seat as recited in claim 1 wherein the first and second seat elements are successive in the seat, the first seat element being borne and directly movable relatively to the second seat element, the first and second seat elements each including an inclinometer, each inclinometer being connected to an information processer for providing the latter with a relative inclination of the first seat element with respect to the second seat element.

3. The seat as recited in claim 1 wherein at least one of the first and second seat elements is displaceable relatively to the other of the first and second seat elements in translation and includes an accelerometer configured to measure the relative acceleration between both seat elements and includes an information processor for computing the relative position of the two seat elements by double integration over time of the measured relative acceleration.

* * * * *